May 7, 1946.  J. H. PHILLIPS  2,399,939
DRILL CHUCK
Filed Jan. 28, 1944
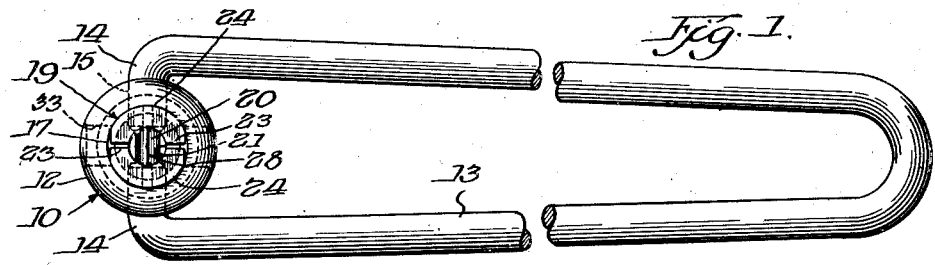
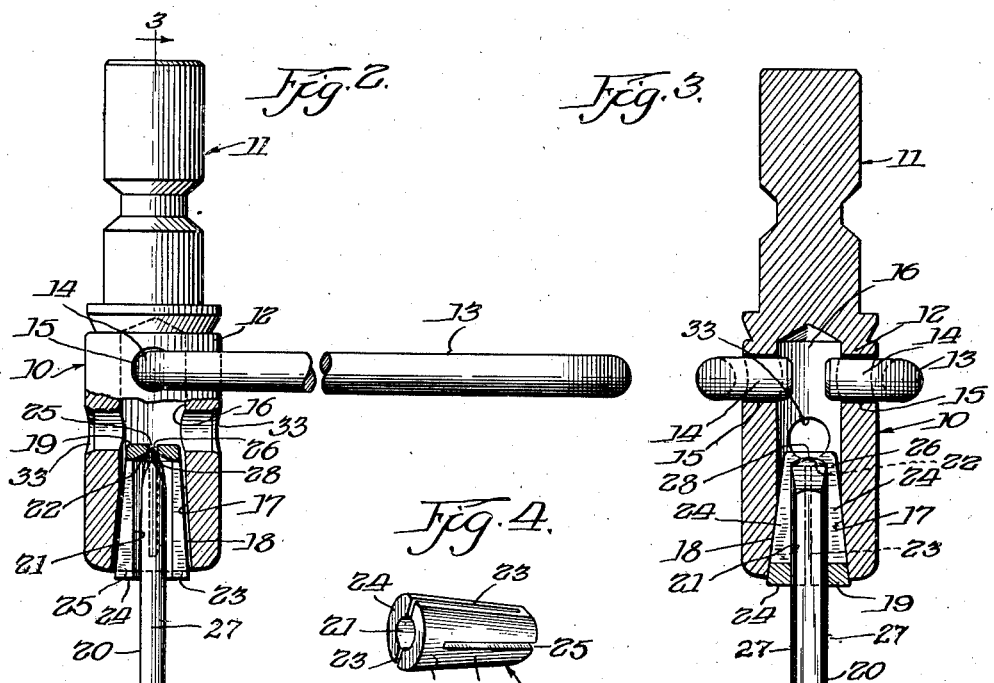
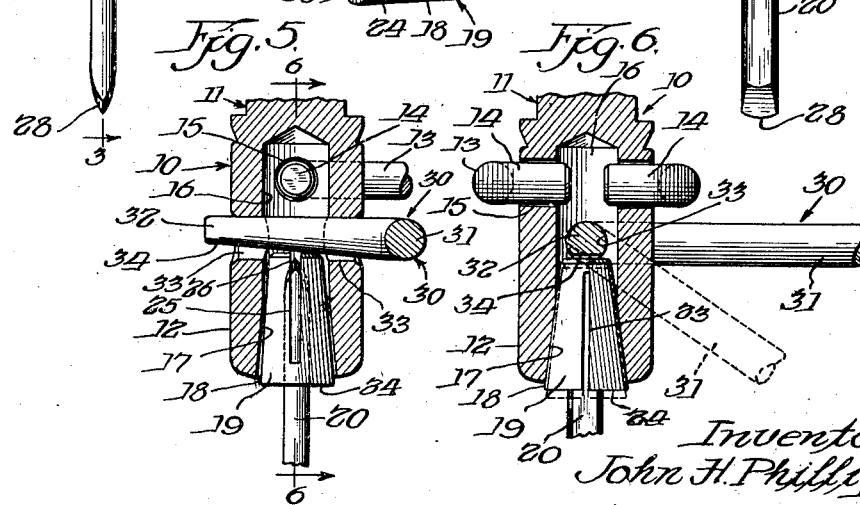
Inventor:
John H. Phillips
By Shie & Shie
Attys.

Patented May 7, 1946

2,399,939

UNITED STATES PATENT OFFICE 2,399,939

DRILL CHUCK

John H. Phillips, Chicago, Ill.

Application January 28, 1944, Serial No. 520,140

8 Claims. (Cl. 279—54)

This invention relates to drills and more particularly to improved means for removably securing a double pointed drill point in a chuck with either pointed end of the drill point exposed for use. The drill forming the subject matter of the specification is especially adapted for drilling stone, concrete, cement and the like, although its use is not limited thereto.

Among the object of this invention is the provision of a self cleaning double ended drill point, one that may be sharpened by the ordinary workman, one that may be used until one cutting edge becomes dull, and then it may be reversed in the chuck with the sharp cutting edge exposed for use.

Another object of this invention is the provision of simple and efficient means to quickly attach a double pointed drill point in the chuck and to release it therefrom. Another object is the provision of means which function to increase the gripping effect of the chuck on the drill point during the operation of the drill, whereby to eliminate any possibility of the drill point being loosened in the chuck during operation. Another object is the provision of an adapter for clamping the drill point in the chuck which adapter is easily and readily inserted into the head of the chuck and fastened therein without the use of any special tool. Another object is the provision of means for easily and readily disconnecting the adapter and drill point from the chuck.

With these and other objects and advantages in view this invention consists in the several novel features of construction, arrangement and combination of parts hereinafter fully set forth and claimed.

One embodiment of the invention is illustrated in the drawing accompanying this specification, in which:

Fig. 1 is an end view of the drill looking from below.

Fig. 2 is a view, partly in side elevation and partly in central axial section, illustrating the interior of the chuck.

Fig. 3 is a vertical cross section taken on the line 3—3 of Fig. 2.

Fig. 4 is a perspective view of the adapter alone.

Fig. 5 is a fragmental, central, vertical section through the head of the chuck and illustrating a tool for disengaging the adapter from the head of the chuck, and Fig. 6 is a fragmental, vertical cross section taken on the line 6—6 of Fig. 5.

Referring to said drawing and first to Figs. 1 to 4 inclusive, the reference character 10 designates the chuck of the drill, which, in accordance with the present disclosure, is provided at one end with a shank or stem 11 whereby to adapt the drill to a pneumatic or other percussion hammer (not shown). The shank or stem is designed to be inserted into the tool holder of a pneumatic or other hammer and in operation is given a succession of blows thereby. However, an ordinary hammer may be employed to pound the drill.

Secured to the head 12 of the chuck is a handle 13, here shown in the form of a length of rod or heavy wire bent upon itself midway between its ends to form a U shaped member, the ends of which are bent transversely of the longitudinal axis of the handle to provide fingers 14 that are rotatively seated in oppositely disposed holes 15 formed in the head 12. The inherent resiliency of the bent up handle serves to hold the fingers in the holes against accidental disconnection from the chuck. Furthermore this swiveled connection between the handle and chuck permits the free play of the handle relative to the chuck.

The head 12 of the chuck is axially bored as at 16 and the outer end portion of the bore flares outward to provide an inwardly tapered socket, the wall 17 of which cooperates with the tapered face 18 of an adapter 19 that serves to grip the drill point 20.

The adapter is in the form of a slotted frustum of a cone and contains an axially disposed bore 21, which extends inward from its largest end and throughout the greater portion of its length. As shown the bore 21 terminates at an end wall 22. The annular wall of the adapter is slotted as at 23 to provide two diametrically opposed jaws 24. These slots terminate at places adjacent the small end of the adapter thereby leaving sufficient stock at the closed ends of the slots to yieldably hold the two jaws in spaced relation with respect to each other.

The smaller end of the adapter is also slotted axially of the adapter as shown at 25, which slots extend throughout the major portion of the length of the adapter and provide two oppositely disposed flat faces 26, the function of which will be presently explained.

The drill point 20 is desirably made from a flat piece of stock, desirably having cylindrical edges 27, with both of its ends ground off to provide tapered cutting points 28 at both ends of the drill point which terminate in sharp cutting edges. In assembling the drill point with the chuck, the drill point is inserted into the bore of the adapter bringing one tapered cutting edge into that part of the slot 25 beyond end 22 of the bore 21. This brings the tapered sides of the cutting point into seating contact with the crotch formed by the flat faces 26 and the end wall 22 of the bore and positively prevents relative rotation between the drill point and the adapter. By tapping the protruding end of the adapter, the latter is driven further into the tapered socket of the head, and as a result thereof the jaws 24 are swung inward and the walls of the bore 21 are impinged against the drill point thereby frictionally securing it in place in the adapter. To enable the jaws to be freely moved toward each other in the adapter, the faces of the jaws adjacent the slots may be flattened slightly as seen in Fig. 4.

When assembled as above set forth, the drill is ready for use. The external cutting point of the drill point is placed upon the object to be drilled and the pneumatic or other percussion hammer is set in motion, or the shank is hammered with an ordinary hammer. By turning the drill back and forth during the drilling operation a round hole is drilled into the object.

To facilitate the removal of the drill point from the chuck, a tool 30 is provided. This tool may be in the form of an L shaped round rod of which the part 31 comprises a handle and the part 32 a prying member. The prying member 32 of the tool has a flattened side 34 which tapers toward the free end of the prying member. The head of the chuck is formed with diametrically opposite round holes 33 disposed with their lower edges slightly below the smaller end of the adapter.

To free the adapter from the frictional engagement with the head, the prying member 32 of the tool is inserted into the holes 33 in the head, with the flat face of the prying member engaging the small end of the adapter, and the handle 31 is then swung upon the axis of the prying member in either direction, as for example from the position of the handle seen in full lines in Fig. 6 to the dotted line position shown therein, thereby bringing the corner formed between the flat face and the cylindrical face of the prying member into engagement with the small end of the adapter. By rotating the handle further, pressure is brought to bear against the small end of the adapter and it is thereby pried out of frictional engagement with the tapered wall of the head whereupon the adapter will easily fall out of the tapered socket and the drill point may be easily withdrawn from the bore in the adapter.

In order to accommodate the drill to drill points of various diameters, several adapters may accompany the drill, each having a bore of the required diameter to fit a given drill.

From the above it is apparent that I have provided a simple but highly efficient drill in which either end of the drill point may be readily inserted into the chuck with a sharp cutting edge exposed for use, and may also be easily and readily removed therefrom. Furthermore either tapered point of the drill point may seat at the end of the bore in the adapter, without any injury to its cutting edge, and that a positive connection is provided between the drill point and adapter which prevents any relative rotation between the two.

The slots 23 and 25 enable the jaws 24 to close against the edges of the drill point in one direction, and the smaller end of the adapter to close upon the sides of the drill point in a direction at right angles to the direction in which the jaws close upon the drill point.

Furthermore, the drill point is self cleaning, is easily sharpened, and when one cutting edge becomes dull, the drill point may be readily detached from the chuck, reversed and reinserted, thereby exposing a sharp edge for use, instead of having to stop operation while the drill point is being sharpened. Moreover the drill point may seat itself in the adapter without danger of injury to the cutting edge.

Having thus described the invention, it is obvious that various immaterial modifications may be made in the same without departing from the general scope and field of this invention; hence, it is not to be understood that the present device is to be limited to the exact form, construction, arrangement and combination of parts herein shown and described or to the uses mentioned.

What I claim as new and desire to secure by Letters Patent is:

1. In a drill, a chuck comprising a head having an inwardly tapered socket at one end, a tapered adapter arranged to be received in said tapered socket with its tapered face in contact with the tapered face of the socket, said adapter having an axial bore extending partway therethrough and adapted to receive a cylindrical double pointed drill point having flat sides and tapered cutting edges, said adapter further comprising two spaced apart connected together jaws and said adapter having a slotted seat against which a tapered end of the drill point may seat with its cutting edge disposed in the slot, the jaws being adapted to be impinged against the cylindrical edges of the drill point and said faces of the slotted seat being arranged to be impinged against the tapered sides of the cutting edge whenever the jaws are forced inward in the tapered socket of the head.

2. In a drill, a chuck comprising a head having an inwardly tapered socket at one end, and a tapered adapter arranged to be received in said tapered socket with its tapered face in contact with the tapered face of the socket, said adapter having an axial bore extending part way therethrough and adapted to receive a cylindrical double pointed drill point having two flat sides and tapered cutting edges, said adapter further comprising two spaced apart connected together jaws arranged to be impinged against the cylindrical edges of the drill point and there being a slot extending transversely through the connected together portion of said jaws into which a tapered cutting edge of a drill point is received with the tapered sides of the point seating against corners formed at the end walls of the bore, whereby to positively prevent relative rotation between the drill point and adapter.

3. In a drill, a tapered adapter having two spaced apart jaws connected together at the small end of the adapter, and the adapter having an axial bore extending inward from its larger end throughout the greater portion of its length, and adapted to receive a cylindrical drill point having two flat sides and a tapered cutting point at each end, the smaller end of the adapter being also slotted transversely of the jaws to a depth beyond the end of the bore in the adapter whereby the cutting edge is received in the slot, the oppositely opposed faces of said slot cooperating with the end wall of the bore to provide seats against which a tapered end of the drill point seats and against which the side faces of said slot are impinged when the adapter together with a drill point are inserted into the bore.

4. In a drill, a tapered adapter having two spaced apart jaws connected together at the small end of the adapter, there being an axial bore extending part way through the adapter from its larger end and adapted to receive a cylindrical double pointed drill point having two flat sides and tapered cutting edges, and there being a seat for the drill point at the end of the bore functioning to prevent relative rotation between the drill point and adapter, the jaws of the adapter when moved toward each other impinging upon the cylindrical edges of the drill point.

5. In a drill, a tapered adapter slotted lengthwise of itself to provide two spaced apart and connected together jaws, said adapter having an axial bore extending from its large end part way through the adapter, the connected together end of the jaws being slotted transversely of the jaws to a depth extending below the end of the bore and providing a space into which a sharpened tapered end of a drill point may extend with its tapered sides seated against the corners between the faces formed by said last mentioned slot and the end wall of the axial bore, with the flat faces of the slot impinged against the tapered sides of the drill point whereby to prevent relative rotation between the drill point and the adapter.

6. In a drill, the combination of a chuck having a tapered bore, a tapered longitudinally slotted adapter removably seated in said bore and formed with jaws between the slots, said adapter having a drill receiving bore, and a flat double ended drill point removably held in said bore of the adapter, the latter having a protective seat for the cutting edge of the drill point which is held in the adapter, and the jaws being arranged to be impinged against the narrower edges of the drill point.

7. In a drill, a chuck comprising a head having an inwardly tapered socket at one end, a tapered adapter arranged to be received in said socket with its tapered face in contact with the tapered face of the socket, said adapter having an axial bore extending partially therethrough and adapted to receive a cylindrical double pointed drill point having flat sides and tapered cutting edges, said adapter being slotted inward from its larger end to provide two jaws that are arranged to be impinged against the cylindrical edges of the drill point, and being also slotted inwardly from its smaller end at right angles to the first mentioned slot to provide flat faces arranged to be impinged against the tapered sides of the cutting edge of the drill point.

8. In a drill, the combination of a chuck having a tapered bore, a tapered adapter removably seated in said bore with its tapered face seated on the tapered face of the bore in the chuck, said adapter being axially bored part-way from its larger end, and being slotted from both ends, with aligned slots disposed at right angles to the other aligned slots, whereby the adapter may close on a flat drill point in two directions, one at right angles to the other, with the faces of the bore impinged against the narrower edges of the drill point and other faces impinged against the tapered sides of a cutting edge of the drill point.

JOHN H. PHILLIPS.